June 16, 1925.  
C. McCULLOUGH  
1,542,347  
EGG WASHING MACHINE  
Filed Jan. 8, 1923  
4 Sheets-Sheet 1

INVENTOR  
Charles McCoullough.  
BY White Prost & Evans  
HIS ATTORNEYS.

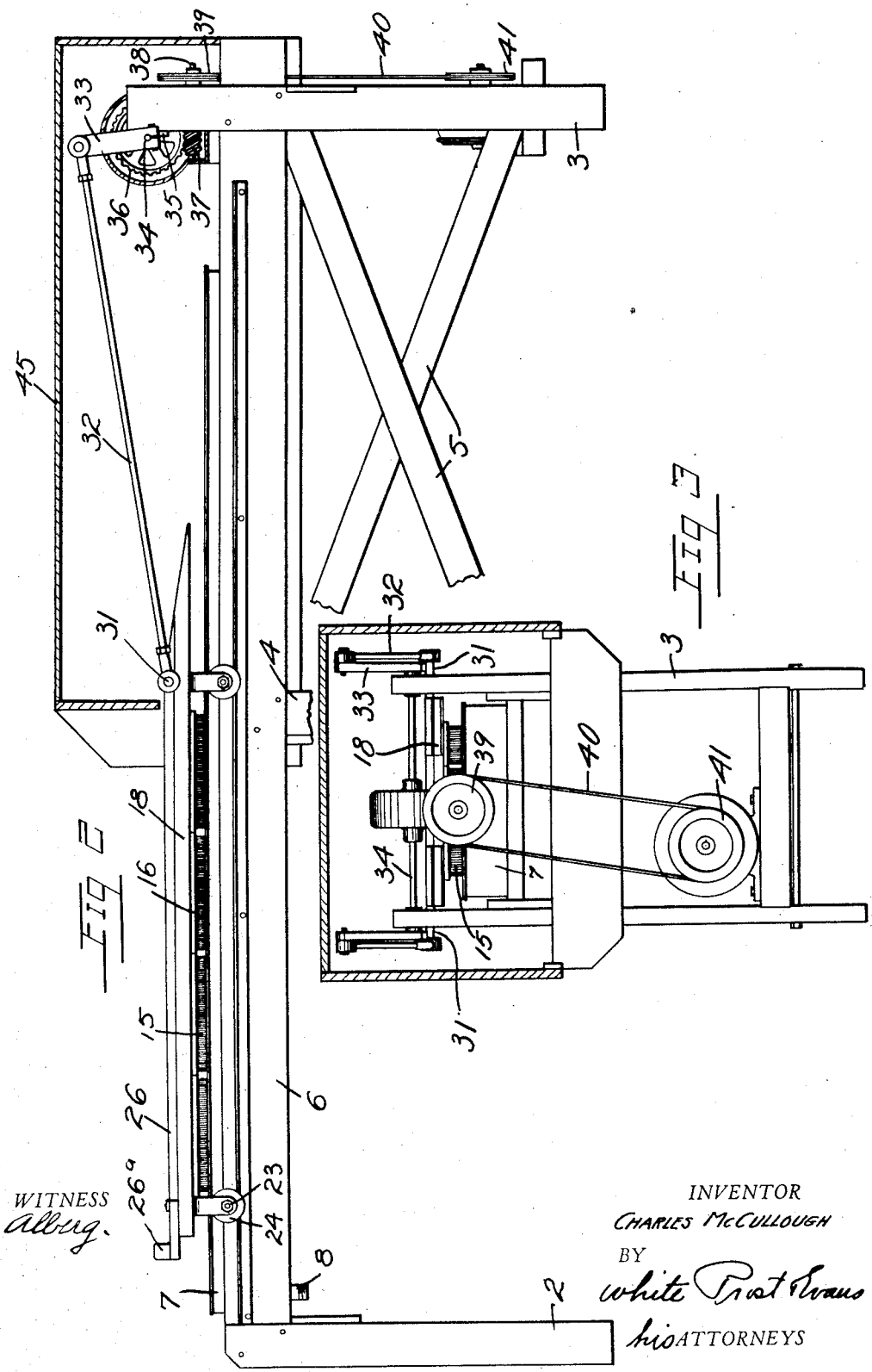

June 16, 1925.
C. McCULLOUGH
EGG WASHING MACHINE
Filed Jan. 8, 1923
1,542,347
4 Sheets-Sheet 3
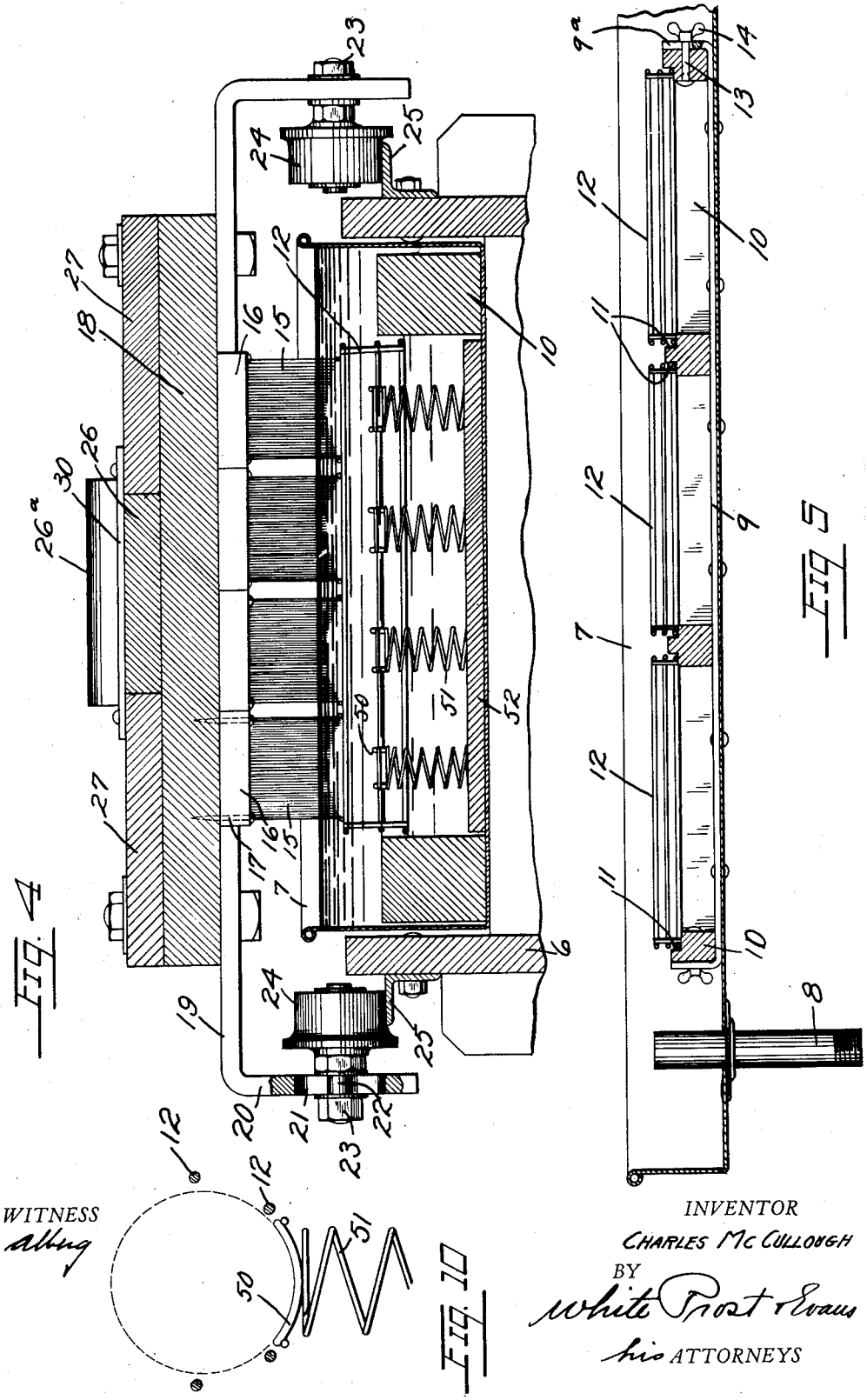
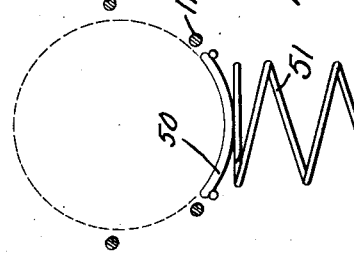
INVENTOR
CHARLES McCULLOUGH
BY
White Frost Evans
his ATTORNEYS June 16, 1925.
C. McCULLOUGH
1,542,347
EGG WASHING MACHINE
Filed Jan. 8, 1923    4 Sheets-Sheet 4
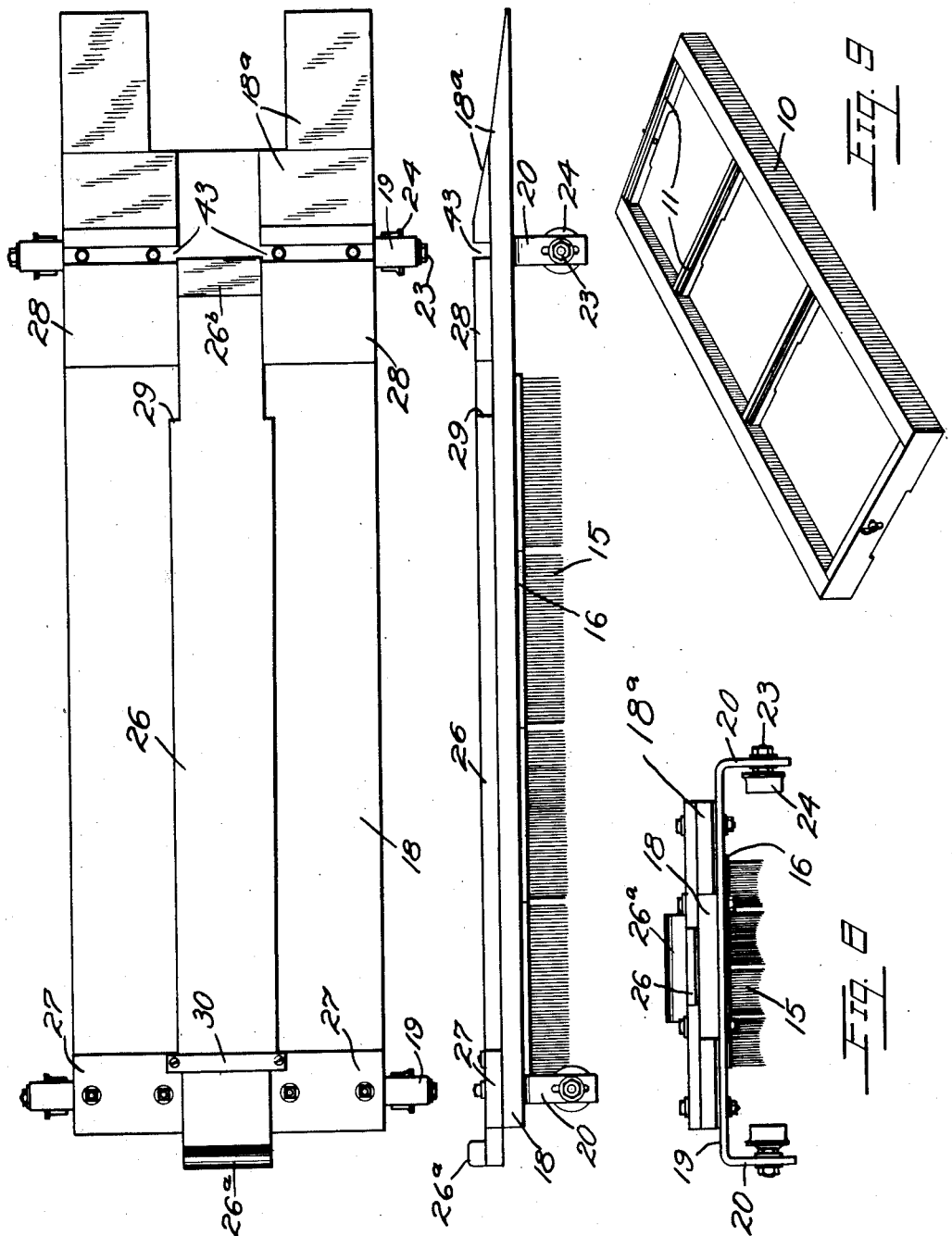
WITNESS
A. E. Alberg
INVENTOR
CHARLES McCULLOUGH
BY
White Prost & Evans
his ATTORNEYS Patented June 16, 1925.

1,542,347

UNITED STATES PATENT OFFICE.

CHARLES McCULLOUGH, OF SAN FRANCISCO, CALIFORNIA.

EGG-WASHING MACHINE.

Application filed January 8, 1923. Serial No. 611,471.

*To all whom it may concern:*

Be it known that I, CHARLES McCUL-LOUGH, a citizen of the United States, and a resident of the city and county of San Francisco, State of California, have invented a new and useful Egg-Washing Machine, of which the following is a specification.

The present invention relates to an apparatus for the washing of objects, more particularly for the washing of poultry eggs.

It is one of the objects of the present invention to provide for the effectual and rapid washing of a number of eggs at one operation and especially it is an object to provide for the washing of eggs in such manner as to reduce and practically eliminate expensive loss due to the breakage of eggs while being washed.

It is also an object of the invention to provide an apparatus in which the eggs are mechanically washed in an organization operated with a minimum consumption of power.

Another object of the invention is to provide an egg washing machine in which eggs are subjected to a washing action and have relative movement with respect to washing brushes which are constructed and arranged to wipe the eggs and to rotate the same so that the entire surface of the eggs will be quickly subjected to a brushing and washing effect. In this connection it is an object of the invention to provide a machine in which means are provided for the reception of removable egg holding trays as to which a movable brush device is reciprocated and is under control of and operated by a continuously operating mechanism. Further means are provided for the instant interruption of the brushing device, at will, to enable the introduction and removal of egg holding trays without interrupting the continuous action of the brush operating means.

With the above objects a further purpose of the invention is to provide a machine which is of comparatively simple and inexpensive construction and all of whose parts are so arranged and designed as to provide for ready access, cleaning and removal.
Further, it is an object to provide means for the desired adjustment of the brushing device with respect to a water tank and also to provide means enabling the adjustment of a tray receiving rack in the water tank.

The invention possesses other objects and features of advantage, some of which with the foregoing, will be made manifest in the following description of the preferred form of the invention which is illustrated in the drawings accompanying and forming part of the specification. It is to be understood that it is not intended to limit the invention to the embodiment shown by the said drawings and description, as variations may be adopted within the scope of the invention as set forth in the claims.

Fig. 2, is a side elevation of the machine, parts being in section.

Fig. 3, is an end view of the machine looking in the direction toward the right hand end of Fig. 2.

Fig. 4, is a cross sectional view showing on a larger scale, the construction of the brush carriage, the brush and the water tank with its tray rack.

Fig. 5, is a sectional detail taken longitudinally of the tank and showing the adjustable supporting means of the tray rack in the tank.

Fig. 6, is a plan view of the dismounted brush carriage with its controller.

Fig. 7, is a side elevation of the brush carriage with the brush as applied.

Fig. 8, is an end view of the brush carriage looking toward the right hand end of Fig. 7.

Fig. 9, is a perspective of the tray holding rack.

Fig. 10, shows a cushion arranged in the tank for slightly elevating objects in the trays.

Figure 1:
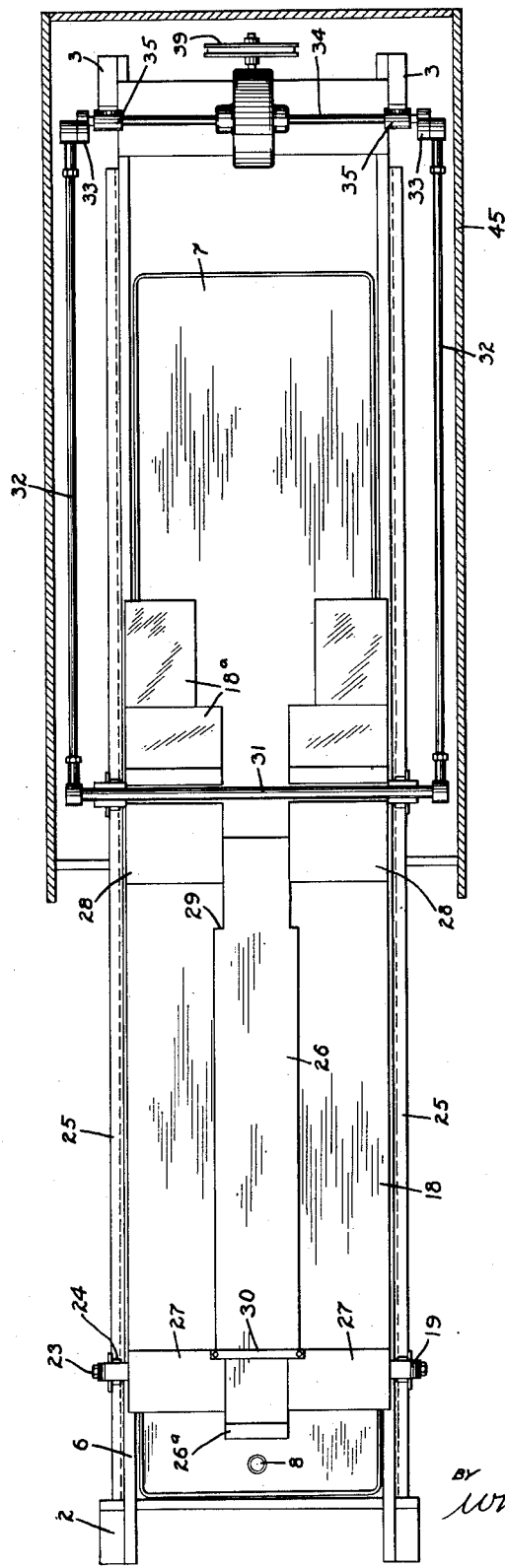
Fig. 1, is a plan view of a preferred form of the machine of this invention, parts being in section.

The present invention consists of a machine which is provided with an elongated shallow tank in which there is arranged an adjustable means to receive a removable rack in which there may be removably mounted a plurality of independent basket-like egg trays. In these trays the eggs are arranged in such manner that they may be rotated upon their major axes when they are submerged in water or any washing solution or liquid in the tank and when engaged by a reciprocating brush forming a part of the present machine. The brush consists of a device mounted upon a carriage that is reciprocable so as to carry the brush bristles or hairs to and fro over the eggs held in the path of the brushing means while the eggs are submerged. In order to control the operation of the machine to permit the introduction and removal of different batches of eggs successively to be washed, means are included for interrupting the driving of the brush carriage without interrupting the continuous operation of the carriage driving means.

A preferred embodiment of the invention is illustrated as comprising a substantial and suitable frame having at its front end legs 2, and its rear end legs 3, and intermediately being provided with legs 4, which preferably are braced to the legs 3, by bracing 5. Longitudinal rails 6, of the frame are provided at the upper portions of the legs and suitably transversely braced and form a support upon which may be mounted a comparatively shallow liquid holding tank 7, which projects slightly above the longitudinal rails 6, of the frame as clearly shown in Fig. 4, and between which rails the tank extends from side to side and is of such length that it extends from the front end to a point somewhat short of the rear end of the frame. The tank is provided at one end with a suitable drain and overflow plug 8.

In the bottom of the tank 7, there is secured or provided upwardly extending end brackets 9, spaced longitudinally from each other in the tank and preferably on its longitudinal center and between these upright brackets 9, is adapted to be inserted a removable frame-like rack 10, clearly illustrated in Fig. 9, and which includes transverse pieces having their inner corners rebated at 11, to form sunken seats spaced from each other sufficiently to permit the ready insertion of a removable egg holding tray very clearly indicated at 12, and which has been referred to above as described in my co-pending application. The tray is preferably constructed of wire to form a cellular basket in which eggs are arranged in rows extending transversely with respect to the length of the washing tank 7, the eggs in the transverse rows being placed end to end so that they may be rotated upon axes transverse to the tank. To facilitate the mounting of the tray-rack 10, in the tank, the upper ends of the brackets 9, are slotted as at 9ª, to receive the extending shank of a bolt 13, projecting from the contiguous cross and end piece of the rack 10, and on which bolt end is provided a fastening device as a wing-nut 14, designed to be screwed up against the outer surface of the vertical, respective bracket 9. This form of fastening enables the tray-rack 10, to be vertically adjusted within the tank so as to raise or lower the egg trays 12, as may be desired and determined by the size of the eggs being washed.

The washing of each of the eggs is accomplished through means adapted to be reciprocated with respect to the egg trays and is shown as comprising a brush or series of brushes, the hairs or bristles 15, of which extend down from a backing in the form of brush-backs 16, a suitable number of which is secured as by screws 17, to the bottom surface of a carriage body or board 18, arranged horizontally and extending above the tank 7, so that the lower ends of the brush bristles or hairs will wipe over the subjacent eggs in the trays 12, of which there is here shown three arranged in a row longitudinally along the tank at its front end, which might be considered the feeding end since the loaded trays are introduced into and removed from the rack 10, which is in the front end of the machine.

Preferably the lower ends of the brush, hairs or bristles are arranged in a concave curved line, Fig. 8, approximating the curvature of the shells of the eggs.

The brush carriage body 18, is shown as mounted upon transversely extending truck frames 19, having downturned ends 20, slotted at 21, to receive axles 22, adjustable vertically in the slots and secured at desired positions by suitable means as clamp-nuts 23. The inner ends of the axles carry respective, loose, flanged rollers 24, operating on longitudinally extending angle-iron tracks 25, secured to the upper portion of the side rails 6, of the frame; the flanges of the wheels 24, preventing undue lateral movement of the truck while it has free movement longitudinally on the rails.

The truck is shown in detail in Figs. 6, 7 and 8, and upon the body 18, there slidably mounted a central, longitudinally extending controlling device in the form of a plank 26, longitudinally shiftable between a front set of guides 27, on the body 18, and a rear set of guides 28, on the rear end of the body. The controlling member 26, is designed to have a limited sliding movement on top of the body 18, and between its guides 27—27 and 28—28. Any suitable stops may be utilized to limit the movement of the controlling device. As here shown, its ends are shouldered as at 29, by rebating the side edges of the member 26, so that it will engage alternately against the contiguous ends of the front and rear guides 27 and 28, which thus form fixed stops. The member 26, is retained in its operative position by a transverse strap 30, secured to the front guide blocks 27, and on the forward end of the controlling member 26, is provided means by which it may be conveniently shifted longitudinally and comprising, for instance, an upwardly extending transverse cleat or handle forming part 26ª.

From this it will be seen that a carriage construction has been provided on the lower portion of which is arranged brushes that are designed to sweep back and forth over the trays of eggs disposed in the tank 7, through which water is preferably continuously run while eggs are being washed.

One of the features of the present invention consists in a continuously operating driving mechanism involving means adapted to be readily connected to and disconnected from the carriage so that the latter is mechanically reciprocated. A simple and practical form of actuating means includes, as here shown, an actuating bar 31, Fig. 1, extending transversely across the top of the carriage and having its ends suitably connected to a pair of parallel links or pitman rods 32, of equal length and attached to co-axial cranks 33, on a crank shaft 34, mounted in suitable bearings 35, on the upper corner of the back posts or legs 3—3. On the crank shaft is a reduction worm gear 36, engaging a worm 37, on a worm shaft 38, carrying a pulley wheel 39, which is driven by suitable connection as a belt 40, extending from a motor driven pulley wheel 41.

The above driving mechanism, when in operation, results in the reciprocation of the actuating bar 31, backwardly and forwardly with respect to the frame and tank of the apparatus. The actuating bar 31, is designed to be connected to and disconnected from the carriage readily and at will so as to secure the operation of the carriage. This is conveniently and effectually accomplished by providing means on the carriage to be engaged by the actuating bar. As shown, the rear guides 28, are transversely divided or notched at 43, to receive the bar 31, which, when in engagement with the walls of the seat 43, serves to reciprocate the carriage endwise. The connecting and disconnecting of the actuating bar is obtained as follows:—The controlling member 26, has its top in the same plane as the tops of the guides 28, and when the member 26, is pulled forwardly so that it engages the stop guides 27, the inclined end 26ᵇ, recedes to a position in front of the transverse seats or notches 43, and the push or actuating bar 31, may then drop freely into the open seats 43, and thereupon serve to reciprocate the carriage. To stop the actuation of the carriage the handle portion 26ᵃ, of the controlling member 26, is grasped and the inclined end 26ᵇ, of the controller is shifted so that it enters as a wedge beneath the actuating bar 31, and lifts it from engagement in the seats 43, until it rests on the tops of the guides 28 and the top of the controlling member 26, upon which it will play back and forth without actuating the carriage. The rearmost top surfaces of the guides 28, and the carriage body 18, are downwardly inclined as at 18ᵃ, so that in the event of the actuating bar 31, riding down toward the rear end of the carriage, it will not engage any interfering obstruction, but will play freely on the inclined surfaces 18ᵃ, and do no damage.

The rear end of the apparatus may be covered with a suitable hood or house 45.

Since the eggs are arranged in their trays in a plurality of rows each of which extends transversely across the tank and since the eggs are arranged with their major axes transverse to the tank and at right angles to the direction of movement of the brushes, it will be seen that the brushes will act frictionally, not only to clean the eggs, but also will act to rotate the eggs on their own major axes, first in one direction and then in the other direction, as the carriage operates to and fro. The rotation of the eggs is facilitated because of the fact that while they are being washed, they are rendered more or less buoyant since they are submerged in the washing liquid and have but slight bearing pressure against the contiguous sides of the cage-like trays in which they are retained in their relative positions. This method of washing the eggs has been found highly practicable and is operative with a minimum of loss arising from breakage of the eggs since they are at no time subjected to appreciable violence or pressure and because they are substantially floating in the washing liquid.

It is desirable for the purpose of further reducing the hazard of breaking fragile objects such as eggs, while being washed, to provide means for slightly elevating the objects when the carrying trays 12, are submerged in the liquid in the tank 7. That is, it is desirable to lift the objects from supporting contact with the bottom structure of the tray, which in this case is shown as formed of wire bars 12, Fig. 10. As the trays are inserted in the holding rack or frame 10, the eggs will register with subjacent cradles 50, which are each in the form of a wire frame attached to the upper end of a light spring 51, for each cradle; these springs being connected at their lower ends to a bottom board 52, that may be arranged in the spaces of the rack frame 10. While the eggs may rest on supporting wires in the tray 12, they will be elevated as they engage the cradle 50, on each spring 51, which serves to provide a seat yieldingly carrying the eggs and therefore designed to reduce the pressure and shocks to which the eggs may be subjected during the operation of the brush 15.

What is claimed is:

1. An egg washing machine comprising a tank, means for holding a number of eggs arranged in a common plane in the tank, a brushing device to sweep against the eggs in the holding means, a reciprocable carriage to which the brushing device is secured, and a driving means having a part adapted to be coupled at will to the carriage to operate it.

2. An egg washing machine comprising a tank, means for holding a number of eggs arranged in a common plane in the tank, a brushing device adapted to sweep against the eggs in the holding means, and a reciprocable carriage to which the brushing device is secured, a driving means having a part adapted to be connected to the carriage to operate it, and means for disconnecting the carriage and the driving means at will without interrupting the operation of the driving means.

3. An egg washing machine comprising a tank, means for holding a number of eggs arranged in a common plane in the tank, a brushing device adapted to sweep against the eggs in the holding means, and a reciprocable carriage to which the brushing device is secured, a driving means having a part adapted to be connected to the carriage to operate it, and means mounted on the carriage for disconnecting the carriage and the driving means at will without interrupting the operation of the driving means.

4. An egg washing machine comprising a tank, means for holding a number of eggs arranged in a common plane in the tank, a brushing device adapted to sweep against the eggs in the holding means, a reciprocable carriage to which the brushing device is secured, continuously operating driving means for reciprocating the carriage and including an actuating device adapted to be positively coupled to the carriage and disconnected therefrom without interrupting the operation of the driving means.

5. An egg washing machine comprising a tank, means for holding a number of eggs arranged in a common plane in the tank, a brushing device adapted to sweep against the eggs in the holding means, a reciprocable carriage to which the brushing device is secured, continuously operating driving means for reciprocating the carriage and including an actuating device adapted to be positively coupled to the carriage and disconnected therefrom without interrupting the operation of the driving means, and means mounted on the carriage for effecting the coupling and uncoupling of the actuating bar.

6. In a machine for washing fragile objects, a tank for containing a liquid in which the objects are to be immersed while being washed, and a yieldable support on which an object will rest while it is being washed, said support including a cradle part conforming to the contour of the object to be supported thereon.

7. An egg washing machine comprising a tank, means for holding a number of eggs arranged in a common plane in the tank, a brushing device adapted to sweep against the eggs in the holding means, a reciprocable carriage to which the brushing device is secured, said carriage being provided with a smooth upper surface interrupted by a transverse groove, a pitman and a cross bar in the pitman adapted to seat in said groove.

8. An egg washing machine comprising a tank, means for holding a number of eggs arranged in a common plane in the tank, a brushing device adapted to sweep against the eggs in the holding means, a reciprocable carriage to which the brushing device is secured, said carriage being provided with a smooth upper surface having a transverse groove adjacent one end thereof, a pitman and a cross bar on the pitman adapted in one position of the carriage to engage in the groove and reciprocate the carriage and in another position of the carriage to slide over the smooth surface of the carriage without reciprocating the carriage.

9. An egg washing machine comprising a frame, a tank carried by said frame, means for holding a number of eggs arranged in a common plane in the tank, a brushing device adapted to sweep against the eggs in the holding means, a reciprocable carriage to which the brushing device is secured, rails on said frame, rollers on said carriage engaging said rails, means for vertically adjusting the positions of the rollers with respect to the carriage and continuously operable driving means for reciprocating the carriage, said means being detachably coupled to the carriage in such manner that the carriage may be detached from the driving means without stopping the driving means.

10. In an egg washing machine, a tank for containing a liquid in which the eggs are to be immersed while being washed and an individual yielding support for each egg on which the egg rests while it is being washed.

11. In an egg washing machine, a tank for containing a liquid in which the eggs are to be immersed while being washed an individual yielding support for each egg and a reciprocable brush movable over the eggs.

12. In an egg washing machine, a tank for containing a liquid in which the eggs are to be immersed while being washed, a rack in said tank, an egg holding tray adapted to be disposed in said rack and resilient means for lifting the eggs from the tray.

13. In an egg washing machine, a tank for containing a liquid in which the eggs are to be immersed while being washed, a rack in said tank, an egg holding tray adapted to be disposed in said rack and springs disposed below said tray and adapted to engage the eggs and raise them from the tray.

14. In an egg washing machine, a tank for containing a liquid in which the eggs are to be immersed while being washed, a rack in said tank, an egg holding tray adapted to be disposed in said rack and means for yieldingly supporting the eggs.

In testimony whereof, I have hereunto set my hand.

CHARLES McCULLOUGH.